April 3, 1962   M. BRENNER   3,027,748

TORQUE CALIBRATOR

Filed Nov. 30, 1959

INVENTOR
MORRIS BRENNER

BY *A. Yates Dowell*
ATTORNEY

United States Patent Office 3,027,748
Patented Apr. 3, 1962

3,027,748
TORQUE CALIBRATOR
Morris Brenner, 3509 Alton Place NW.,
Washington, D.C.
Filed Nov. 30, 1959, Ser. No. 856,145
6 Claims. (Cl. 73—1)

This invention relates to the measurement of forces and more particularly to the calibration of torque instruments such as screw drivers and wrenches.

In the manufacture and assembly of various types of apparatus and equipment it is necessary that the fastening elements be assembled with a predetermined torque. Various apparatus and equipment requires a wide range of applied torques as, for example, from relatively large torques applied to assemble the heads of internal combustion engines to small torques used in assembling precision instruments.

In order to assemble such devices various tools are employed some of which have a gauge on which the applied torque may be read and others employ a clutch which slips when a torque in excess of a predetermined amount is applied.

In order to use such torque instruments it is necessary that prior to use they be calibrated with a known reference in order to provide an accurate indication of the torque measured.

Furthermore, in accordance with accepted engineering and manufacturing practice the calibration of torque instruments is checked periodically, or as determined to be necessary, and the required adjustment made. Heretofore, various devices for calibrating such torque tools have been employed, but these have suffered from deficiencies such as inaccuracy, complexity, high cost, requiring skilled operators and limited application.

Accordingly, it is an object of the present invention to provide a torque calibrator which is highly accurate, of simple and inexpensive construction, easy to use by the unskilled, and having a wide application of use.

Figure 1:
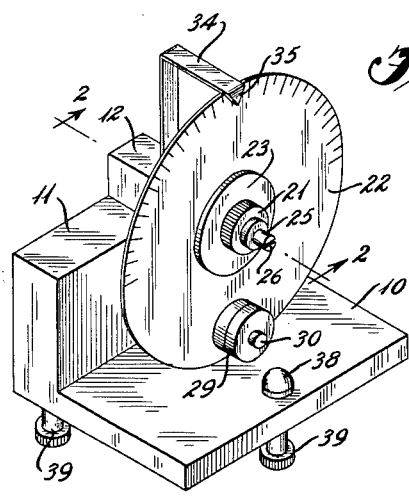
Figure 3:
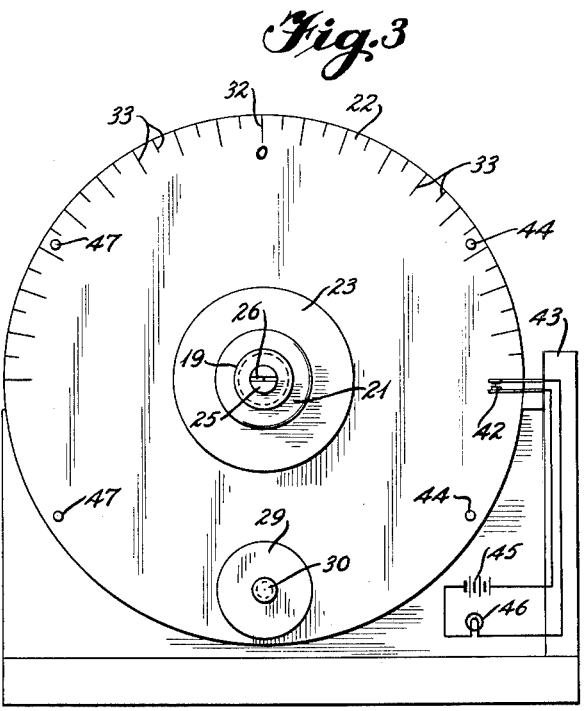
Figure 2:
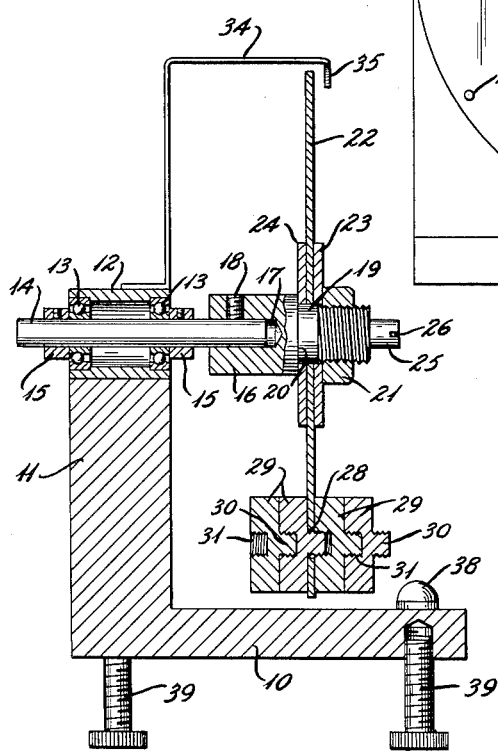

These and other advantages of the invention will become apparent from the following description taken in conjunction with the accompanying drawing, in which:

FIG. 1 is a perspective of an embodiment of the invention;

FIG. 2, a section on the line 2—2 of FIG. 1;

FIG. 3, a front elevation of a modified form; and

Figure 4:
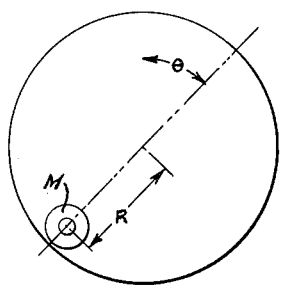

FIG. 4, a schematic diagram illustrating the theory.

Briefly stated, the device of the present invention employs a circular disk which is balanced and freely rotatable about its center on a horizontal axis and has a symmetrical mass of known weight affixed at a predetermined radius. Diametrically opposite the center of the weight is located a zero reference point from which a series of graduations extend to each side adjacent to the periphery of the disk to include the upper hemisphere thereof for indicating the angular inclination or displacement of the disk from a predetermined position about its axis. Centrally of the disk is a fitting to receive the end or head of the instrument being calibrated.

With further reference to the drawing, the device illustrated includes a base 10 having an upright 11 at one end. Mounted on the upper portion of the upright is a housing 12 having antifriction bearings 13 in which is received a shaft 14. The shaft 14 is freely rotatable within the bearings 13 and axial movement of such shaft is prevented by a pair of collars 15. An arbor 16 having a central opening 17 is mounted on one end of the shaft 14 and held in fixed position by a set screw 18. After the arbor is fixed to the shaft it is balanced to maintain the symmetry of the shaft and arbor. The set screws may be of the same material as the collars 15 and arbor 16 in which they are inserted in order to minimize any unbalance caused thereby. Their effect may be negligible in most cases due to their small radius from the axis, especially in the measurmenet of relatively large torques. Obviously, the set screws may be eliminated by using a press fit between the parts.

The arbor 16 is provided with a reduced portion 19 forming a shoulder 20 and the outer end of such reduced portion is threaded for engagement with a nut 21 which is desirably of circular cross-section for accurate balance. A disk 22 is adapted to be mounted on the reduced portion 19 and maintained in fixed position thereon by front and rear circular flanges or collars 23 and 24 respectively which are held in close association between the shoulder 20 and the nut 21. The arbor assembly is rebalanced after the disk 22 and collars 23 and 24 are fixed in position. The outer extremity of the arbor has a further reduced portion 25 provided with a screw driver slot 26 or an alternate fitting having wrench engaging surfaces or the like.

The disk described thus far is symmetrical and balanced about its axis and in order to provide for the application of measurable torque thereto, the disk has an opening 28 at a predetermined radius for receiving weights 29. The weights preferably consist of short cylindrical members each of which has a reduced externally threaded male fitting 30 on one side and an internally threaded opening 31 on the other side for receiving the male fitting of the adjacent cooperating weight. If desired, the weights 29 may be of any other configuration in which the mass of the weight is symmetrical with the axis as, for example, generally conical, spherical, etc. The male fitting 30 and the threaded opening 31 are both symmetrical about the axis of the weight 29 so that interengagement thereof, as indicated in FIG. 2, provides a weight which is geometrically similar about an axis normal to the plane of the disk. Weights of various sizes and masses may be employed in order to change the range of the instrument.

Since the disk is freely rotatable, the weight will remain at its lowermost position when the device is not in use. In order to ascertain the angular position of the disk when rotated, a zero reference point 32 is located diametrically opposite the weight 29 and adjacent to the periphery of the disk 22. A series of graduations 33 extend to each side of the reference point 32 adjacent to the periphery of the disk and include the upper hemisphere thereof. An indicator arm 34 is mounted on the housing 12 and is provided with a pointer 35 extending into contiguous relation with the periphery of the disk 22 and such pointer is positioned to indicate the zero reference point 32 when the disk has not been turned.

The base 10 is provided with a bubble type lever 38 and adjustable legs or leveling screws 39 which are used to position the pointer 35 in relation to the reference point 32 and to position the disk 22 in a vertical plane.

The graduations on the disk may have indications of angular degrees or may read directly in torque units for known weights. Thus, all that an operator has to do is to insert the operating end of the instrument into engagement with the fitting and turn the disk to an angular position in which the desired torque is applied.

Various means may be used to indicate when a predetermined angular displacement is reached in order to facilitate the testing of instruments. For example, a microswitch 42 (FIG. 3) may be positioned on a bracket 43 carried by the base 10. The disk 22 may be provided with a pair of detents 44 which project outwardly from the disk and engage the microswitch 42 to close the contact points thereof when a predetermined torque has been applied. The leads from the microswitch are connected to a source of power 45 and a light 46 although a bell or other visual or audible signal or combination thereof may replace the light 46. The detents 44 are of lightweight material such as thin wire so that they do not materially affect the symmetry and balance of the disk about its axis. However, if desired, an additional pair of detents 47 may be placed diametrically opposite the detents 44 to fully compensate for the torque due thereto.

The construction of the torque calibrator is substantially equivalent from the standpoint of the forces involved to a simple pendulum with a weightless, rigid suspension of length R supporting a mass of weight M. The weight M is symmetrical about an axis perpendicular to the plane of the disk in which the suspension line lies. As in the case of a simple pendulum at rest, the line through the center of the disk (axis of rotation) and the axis of the weight is vertical for zero torque. Also as in the case of the pendulum, when the weight is displaced from its position of rest, the restoring torque T is given by the equation $T=MR$ sine $\theta$.

Torque T will range from $T=0$ to $T=MR$ for $\theta=0°$ and $90°$ respectively. Intermediate values can be obtained from a table of natural sines. Thus, since sine $30°$ equals 0.500, the torque for a $30°$ displacement is $$\frac{MR}{2}$$

In view of the fact that the mass and radius may be easily measured to a high degree of accuracy, and angular graduation accurately indicated, the device may be easily constructed with a high order of accuracy for its purpose and is not subject to the deficiencies of devices using springs, asymmetrical weights and the like.

The device is particularly accurate because of the symmetry of the disk and that of the weight. Such symmetry may be achieved by forming the weight of spherical or conical shape or of another shape provided that there is an axis of symmetry about which the device may be mounted on the disk.

As an example of the accuracy obtainable, mass M may be measured within .001 lb. and the radius R within .001 inch in the construction of the device. Considering a 2 lb. weight on a disk with a radius of 5 inches, this combination will provide a torque of 10 in. lbs. for a deflection of 90 degrees. The angle of deflection at 90 degrees need not be measured closer than 1 degree since sine $\theta$ varies very slowly as $\theta$ approaches 90 degrees, that is, an error of 1 degree will produce an error of only .02% in sine 90 degrees. Even at angles other than 90 degrees the error introduced by inaccuracy in construction or determining the angle of deflection is small.

Thus the combined error involved in the three components of the equation in the above example is of the order of less than 0.1%. Although this level of accuracy is considerably in excess of that used in routine torque measurements, it is indicative of the accuracy attainable.

For routine use the device can be built to provide the accuracy desired by appropriate selection of weights and radius of mounting, with due consideration given to bearing friction and the necessity for balance. By additional refinements accuracy of even higher orders may be achieved. For example, the loss of weight in the disk caused by the removal of material for the opening 28 may be compensated by increasing the mass of the weight engaging such opening by a corresponding amount.

The device has a wide range of torque even for a single weight and by the application of different weights the range may be greatly increased. The function is similar regardless of whether right or left hand torque is applied.

Although the device is especially useful for calibrating torque tools, it can also be used in various other ways, such as in the determination of the location of the center of gravity of masses having complex shapes and weight distribution.

Accordingly, the invention provides a simple, inexpensive device especially adapted for measuring torque accurately and which may be used quickly and simply by relatively unskilled personnel.

It will be obvious to those skilled in the art that various changes may be made in the invention without departing from the spirit and scope thereof and therefore the invention is not limited to that which is illustrated in the drawings and described in the specification, but only as indicated in the accompanying claims.

What is claimed is:

1. A torque calibration instrument comprising a shaft, antifriction means mounting the shaft, a substantially circular disk having its weight symmetrically disposed around its axis and mounted on the shaft with its axis coincident with that of the shaft, a weight of substantially uniform mass distribution and of a configuration which is geometrically symmetrical around its axis, said weight mounted with its axis normal to the plane of the disk on said disk at a predetermined radius from the axis of the disk, instrument-engaging means accessible from the face of the disk and having a central axis coincident with the axis of the disk, and means for indicating the angular displacement of the disk about its axis.

2. The invention defined in claim 1, said weight comprising cylindrical members interconnected and engaging the disk, each cylindrical member having an external axially extending male fitting and an internal axially extending female fitting whereby a plurality of such members may be axially interconnected.

3. The invention of claim 1 in which the angular displacement indicating means comprises a pointer mounted on the base and extending into contiguous relation with the periphery of the disk, said disk having indicia about its periphery.

4. The invention of claim 1 in which the angular displacement indicating means comprises a switch mounted contiguously to the rim of the disk, signaling means connected to the switch, and a detent mounted on the disk and adapted to engage the switch to operate the signaling means when the disk has a predetermined angular displacement.

5. The invention of claim 1 in which the weight is a cylinder.

6. The invention of claim 1 in which the weight is substantially bisected by the disk.

References Cited in the file of this patent

UNITED STATES PATENTS

| | | |
|---|---|---|
| 512,168 | Dunning | Jan. 2, 1894 |
| 530,980 | Witzel | Dec. 18, 1894 |
| 1,308,795 | McCormack | July 8, 1919 |
| 2,486,632 | Burke et al. | Nov. 1, 1949 |
| 2,627,666 | Levrero | Feb. 10, 1953 |